United States Patent [19]

Tanaka et al.

[11] Patent Number: 5,687,074
[45] Date of Patent: Nov. 11, 1997

[54] SYSTEM FOR DEBUGGING SEQUENCE PROGRAM

[75] Inventors: Kunio Tanaka, Akishima; Yasushi Onishi; Kazuo Sato, both of Minamitsuru-gun, all of Japan

[73] Assignee: Fanuc Ltd., Minamitsuru-gun, Japan

[21] Appl. No.: 325,326

[22] PCT Filed: Feb. 23, 1994

[86] PCT No.: PCT/JP94/00286

§ 371 Date: Oct. 24, 1994

§ 102(e) Date: Oct. 24, 1994

[87] PCT Pub. No.: WO94/20889

PCT Pub. Date: Sep. 15, 1994

[30] Foreign Application Priority Data

Mar. 3, 1993 [JP] Japan ................... 5-042316

[51] Int. Cl.⁶ .................. G06F 19/00; G05B 19/048
[52] U.S. Cl. ............................... 364/140; 364/146
[58] Field of Search .................. 364/140, 141, 364/146, 147, DIG. 1 MS File, DIG. 2 MS File; 371/29.1; 395/835–839, 892, 893, 185.1, 183.22

[56] References Cited

U.S. PATENT DOCUMENTS

| | | | |
|---|---|---|---|
| 4,635,183 | 1/1987 | Isobe et al. | 364/146 X |
| 4,683,549 | 7/1987 | Takaki | 364/146 X |
| 4,748,553 | 5/1988 | Itoh et al. | 364/140 |
| 4,991,076 | 2/1991 | Zifferer et al. | 364/147 |
| 5,177,420 | 1/1993 | Wada et al. | 364/147 X |
| 5,359,507 | 10/1994 | Egami | 364/141 X |

FOREIGN PATENT DOCUMENTS

| | | |
|---|---|---|
| 57-14954 | 1/1982 | Japan. |
| 63-118846 | 5/1988 | Japan. |
| 63-195781 | 8/1988 | Japan. |
| 63-298503 | 12/1988 | Japan. |
| 2-77902 | 3/1990 | Japan. |

OTHER PUBLICATIONS

Monitor Device for Programmable Controller, Omron Corp "Patent Abstracts of Japan", vol. 15, No. 270, p. 1225, Jul. 9, 1991.

Primary Examiner—Joseph Ruggiero
Attorney, Agent, or Firm—Staas & Halsey

[57] ABSTRACT

A system for debugging a sequence program generated by flowcharting to allow a chronological flow of steps to be easily confirmed. A data display screen has a time display area which displays a succession of sampling times at predetermined time intervals, and a step number display area which displays the numbers of steps which are executed at the sampling times. The data displayed on the data display screen indicates that the steps of a parallel branch section require respective execution times corresponding to different sampling periods, respectively. As a result, it can be seen at a glance which steps determine the execution speed of the entire parallel branch section.

6 Claims, 4 Drawing Sheets

5,687,074

SYSTEM FOR DEBUGGING SEQUENCE PROGRAM

TECHNICAL FIELD

The present invention relates to a system for debugging a sequence program which is to be executed by a programmable controller (PC), and more particularly, to a system for debugging a sequence program which is generated by flowcharting.

BACKGROUND ART

Sequence programs to be executed by a PC may be expressed by logic descriptions, ladder diagrams, etc. Flowcharting is advantageous as it makes an overall flow of work easy to understand. A flowchart represents a sequential process step by step. One typical example of a flowchart is a sequential function chart (SFC). However, a program representative of specific operations in each step is expressed by logic descriptions, ladder diagrams, etc.

FIG. 3 of the accompanying drawings shows a specific example of a sequence program which is generated according to flowcharting. The sequence program shown in FIG. 3 includes a total of 14 steps ST01~ST14 following an initial step ST00. In a selective branch section 51 following the execution of the step ST01, either one of the steps ST02, ST03, ST04 is selected depending on the executed result of the step ST01. For example, if the step ST04 is selected and executed, then the step ST07 is executed, after which control is transferred to the step ST08.

In a parallel branch section 52 following the execution of the step ST08, the steps ST09, ST10, ST11 are executed at the same time the execution of the step ST08 ends. Since these steps ST09, ST10, ST11 and the next steps ST12, ST13, ST14 have different execution times, the respective routes end at different times. When this happens, one of the steps ST12, ST13, ST14 which ends at first waits for the other steps to end, and then control proceeds to a next step (end step 53 in FIG. 3) at the time the last one of the steps ST12, ST13, ST14 ends.

One major process of debugging a generated sequence program is to reproduce varying states of signals which are traced during the execution of the program, at a low speed on a screen.

Sequence programs generated by flowcharting have many program execution routes if the number of steps and branch instructions are increased. As the many program execution routes are difficult to confirm visually, the sequence programs cannot easily be debugged. If the programmer wishes to know which one of the steps is selected and executed in the selective branch section 51 in FIG. 3 or which one of the steps ST12, ST13, ST14 is the slowest and how long the waiting step has been waiting in a waiting process involving the steps ST12, ST13, ST14, then it has been necessary to determine the execution times of the respective steps and employ a complex technique in a process of displaying tracing and debugging events.

SUMMARY OF THE INVENTION

It is therefore an object of the present invention to provide a system for debugging a sequence program generated by flowcharting while allowing a chronological flow of the steps of the sequence program to be easily confirmed.

To achieve the above object, there is provided in accordance with the present invention a system for debugging a sequence program generated by flowcharting, comprising program executing means for executing the sequence program, sampling means for sampling steps being executed at predetermined time intervals while the sequence program is being executed, step storage means for storing the sampled steps, and display means for displaying data of the stored steps in a time series.

While the sequence program is being executed by the program executing means, steps of the sequence program which are being executed are sampled at predetermined time intervals by the sampling means, and the sampled steps are stored in the step storage means. The stored data are displayed in a time series by the display means.

Since the execution states of the steps are displayed at the predetermined time intervals, the operator can confirm at a glance a chronological flow of executed steps, and hence can simply confirm the execution speeds of certain steps and the simultaneous execution of a plurality of parallel steps.

BEST MODE FOR CARRYING OUT THE INVENTION

Figure 2:
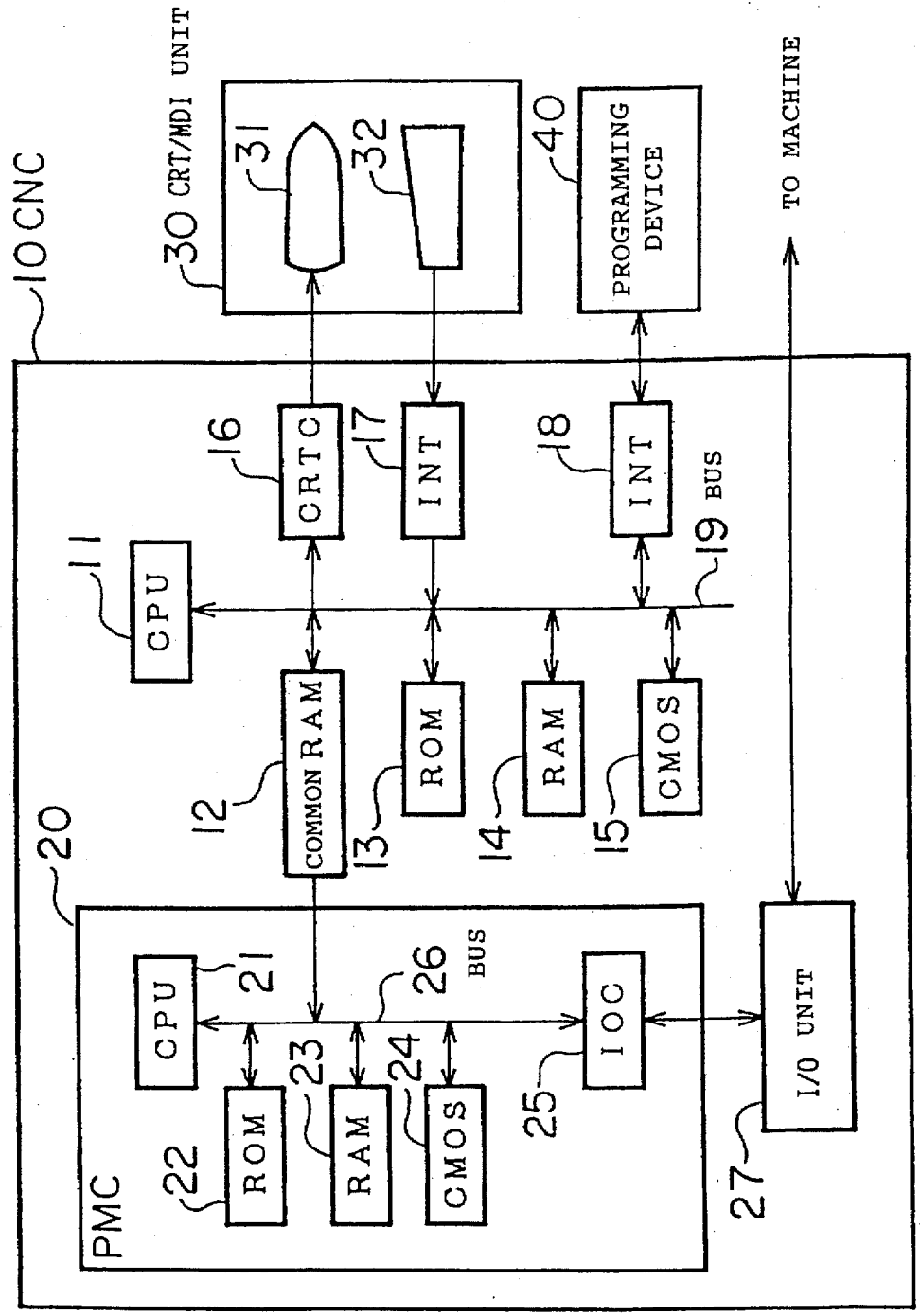
FIG. 2 is a block diagram of the hardware arrangement of a computerized numerical control (CNC) apparatus for carrying out the present invention.

FIG. 2 shows in block form the hardware arrangement of a computerized numerical control (CNC) apparatus for carrying out the present invention. In FIG. 2, a programmable machine controller (PMC) 20 is one type of programmable controller (PC) and included in the computerized numerical control (CNC) apparatus which is denoted at 10. The computerized numerical control (CNC) apparatus 10 has a processor 11 serving as a central processor for controlling the computerized numerical control (CNC) apparatus in its entirety. The processor 11 reads a system program stored in a read-only memory (ROM) 13 through a bus 19, and controls the computerized numerical control (CNC) apparatus in its entirety according to the system program.

A common random-access memory (RAM) 12 serves to transfer data between the CNC apparatus 10 and the PMC 20. The CNC apparatus 10 and the PMC 20 transfer data therebetween through the common RAM 12. The common RAM 12 stores data that are necessary to be accessed simultaneously by the CNC apparatus 10 and the PMC 20.

A RAM 14 stores temporary calculation data, display data, etc. A complementary metal-oxide semiconductor (CMOS) memory 15 is a nonvolatile memory for storing tool correction quantities, pitch error correction quantities, a machining program, parameters, etc. The CMOS memory 15 is backed up by a battery (not shown) such that it operates as a nonvolatile memory to hold the stored data even when the power supply of the CNC apparatus 10 is turned off. The CMOS memory 15 also stores parameters, etc. which are required by the PMC 20.

A graphic control (CRTC) circuit 16 converts digital data including present positions of various axes, an alarm, parameters, image data, etc. into an image signal, and outputs the image signal. The image signal is transmitted to a display unit 31 of a CRT/MDI unit 30, and displayed on the display unit 31. The display unit 31 can also display parameters, ladder diagrams, and debugged data (described later) of the PMC 20. These data are transmitted from the PMC 20 to the display unit 31 through the common RAM 12.

An interface 17 receives data from a keyboard 32 of the CRT/MDI unit 30, and transfers the received data to the processor 11. Data for the PMC 20 can also be entered from the keyboard 32. Specifically, the data entered from the keyboard 32 for the PMC 20 are also transferred through the interface 17 and the common RAM 12 to the PMC 20.

A programming device 40 is connected to an interface 18, so that a machining program generated by the programming device 40 is read in through the interface 18. A machining program edited in the computerized numerical control (CNC) apparatus 10 can be outputted to the programming device 40 through the interface The processor 11 and other components including the common RAM 12, the ROM 13, etc. are connected to each other by a bus 19. Axis control circuits for controlling servomotors, servoamplifiers, a spindle control circuit, a spindle amplifier, a manual pulse generator interface, etc. are omitted from illustration in FIG. 2.

The PMC 20 includes a processor 21 for the PMC connected to the common RAM 12 through a bus 26 which is connected to the bus 19 of the CNC apparatus 10.

The PMC 20 also includes a ROM 22 connected to the bus 26. The ROM 22 stores a management program and a sequence program for controlling the PMC 20. The sequence program is generally generated using a ladder language, but may be generated using a high-level language such as Pascal or the like. In the present embodiment, the sequence program is generated according to an SFC which defines the program step by step. The sequence program can be displayed on the display unit 31. The ROM 22 also stores a program for executing a debugging operation (described later).

A RAM 23 stores input and output signals, which are rewritten as the sequence program is executed. A CMOS memory 24 is in the form of a nonvolatile memory, and stores debugged data sampled during the execution of the sequence program.

An I/O control (IOC) circuit 25 is connected to the bus 26 for converting an output signal stored in the RAM 23 into a serial signal and outputting the serial signal to an I/O unit 27, and also converting a serial signal inputted from the I/O unit 27 into a parallel signal and outputting the parallel signal to the bus 26. The parallel signal from the IOC circuit 25 is stored in the RAM 23 by the processor 21. The input and output signals stored in the RAM 23 can be displayed on the display unit 31 of the CRT/MDI unit 30.

The processor 21 receives command signals such as of an M function command, a T function command, etc., from the CNC apparatus 10 through the common RAM 12, temporarily stores the received command signals in the RAM 23, processes the command signals according to the sequence program stored in the ROM 22, and outputs the processed command signals through the IOC circuit 25 to the I/O unit 27. The I/O unit 27 outputs the received command signals to control hydraulic, pneumatic, and electromagnetic devices on a machine.

The processor 21 also receives input signals supplied from the I/O unit 27 which include a limit switch signal from the machine and a signal from a control switch on a machine control console, and temporarily stores the received signals in the RAM 23. Those input signals which are not required to be processed by the PMC 20 are transmitted through the common RAM 12 to the processor 11. The other input signals are processed according to the sequence program by the processor 21. Some of the processed signals are sent to the CNC apparatus 10, and the other processed signals are outputted through the IOC circuit 25 and the I/O unit 27 to the machine.

The sequence program may contain commands for controlling movement of the axes, etc. When these commands are read by the processor 21, they are transmitted through the common RAM 12 to the processor 11 to control the servomotors. Similarly, the spindle motor, etc. may be controlled by a command from the PMC 20.

A sequence program or the like generated by the programming device 40 may be transferred to the RAM 23, and the PMC 20 may be operated according to the sequence program stored in the RAM 23.

A specific process of debugging the sequence program according to the present invention will be described below. The sequence program shown in FIG. 3 will be used as a sequence program to be debugged by the debugging process.

The sequence program includes a total of 14 steps ST01~ST14 following an initial step ST00. In a selective branch section 51 following the execution of the step ST01, either one of the steps ST02, ST03, ST04 is selected depending on the executed result of the step ST01. For example, if the step ST04 is selected and executed, then the step ST07 is executed, after which control is transferred to the step ST08.

In a parallel branch section 52 following the execution of the step ST08, the steps ST09, ST10, ST11 are executed at the same time that the execution of the step ST08 ends. Since these steps ST09, ST10, ST11 and the next steps ST12, ST13, ST14 have different execution times, the respective routes end at different times. When this happens, one of the steps ST12, ST13, ST14 which ends at first waits for the other steps to end, and then control proceeds to a next step (end step 53 in FIG. 3) at the time the last one of the steps ST12, ST13, ST14 ends.

Steps of the sequence program which are being executed are sampled at certain time intervals, and stored as debugged data in the CMOS memory 24 of the PMC 20. The certain time intervals have been entered in advance by the operator through the keyboard 32 or the like.

Figure 3:
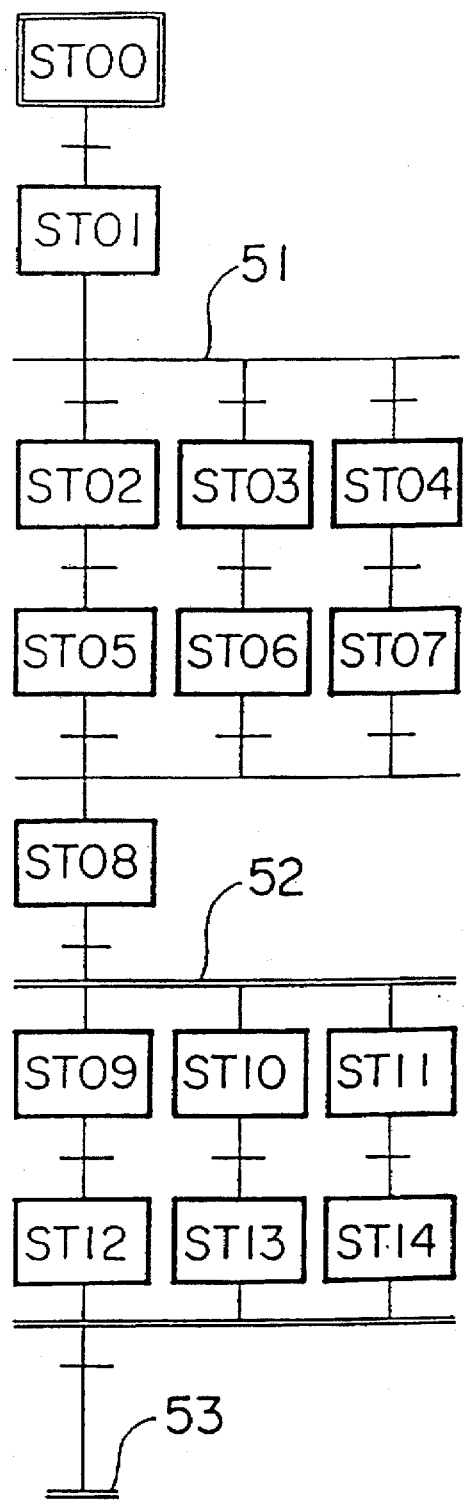
FIG. 3 is a diagram showing a specific example of a sequence program generated by flowcharting.
Figure 4:
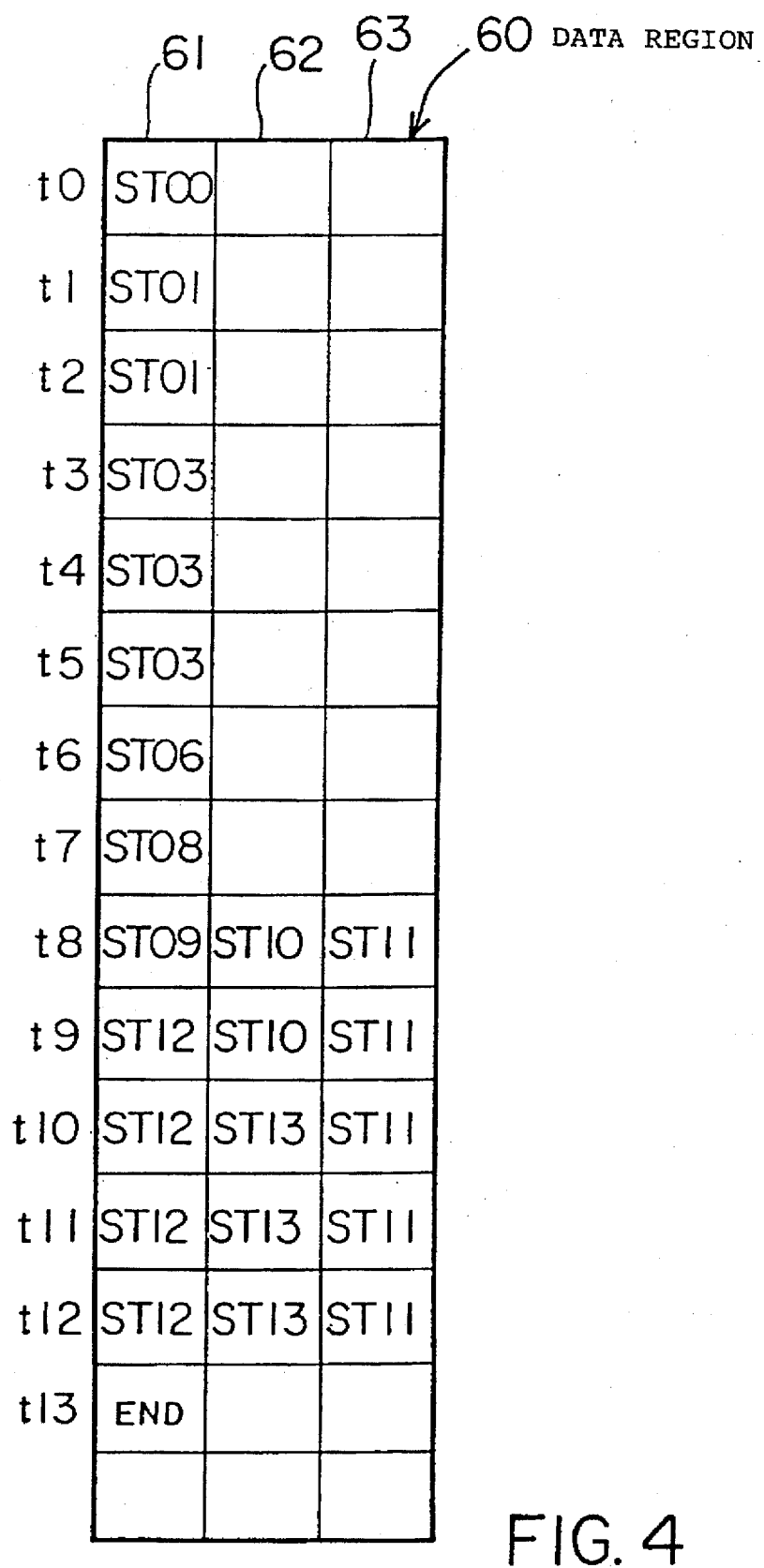
FIG. 4 is a diagram showing an example of debugged data produced when a sequence program is sampled.

FIG. 4 shows an example of debugged data produced when the sequence program in FIG. 3 is sampled. A data region 60 for debugged data has as many execution step columns 61, 62, 63 as the maximum number of steps which can be executed simultaneously. In this example, since there are three steps which can be executed simultaneously as can be seen in the parallel branch section 52, the data region 60 has three execution step columns 61, 62, 63. The data region 60 has storage cells which store executed steps sampled at every 8 ms, including the initial step ST00 at a time t0.

The data of those steps which exist singly at one time, e.g., those at times t0~t7, are stored successively downwardly in cells of the execution step column 61. At a time t8, since control enters the execution of the parallel branch section, the three steps ST09, ST10, ST11 are stored respectively in the execution step columns 61, 62, 63.

The debugged data thus sampled are displayed on the screen of the display unit 31.

Figure 1:
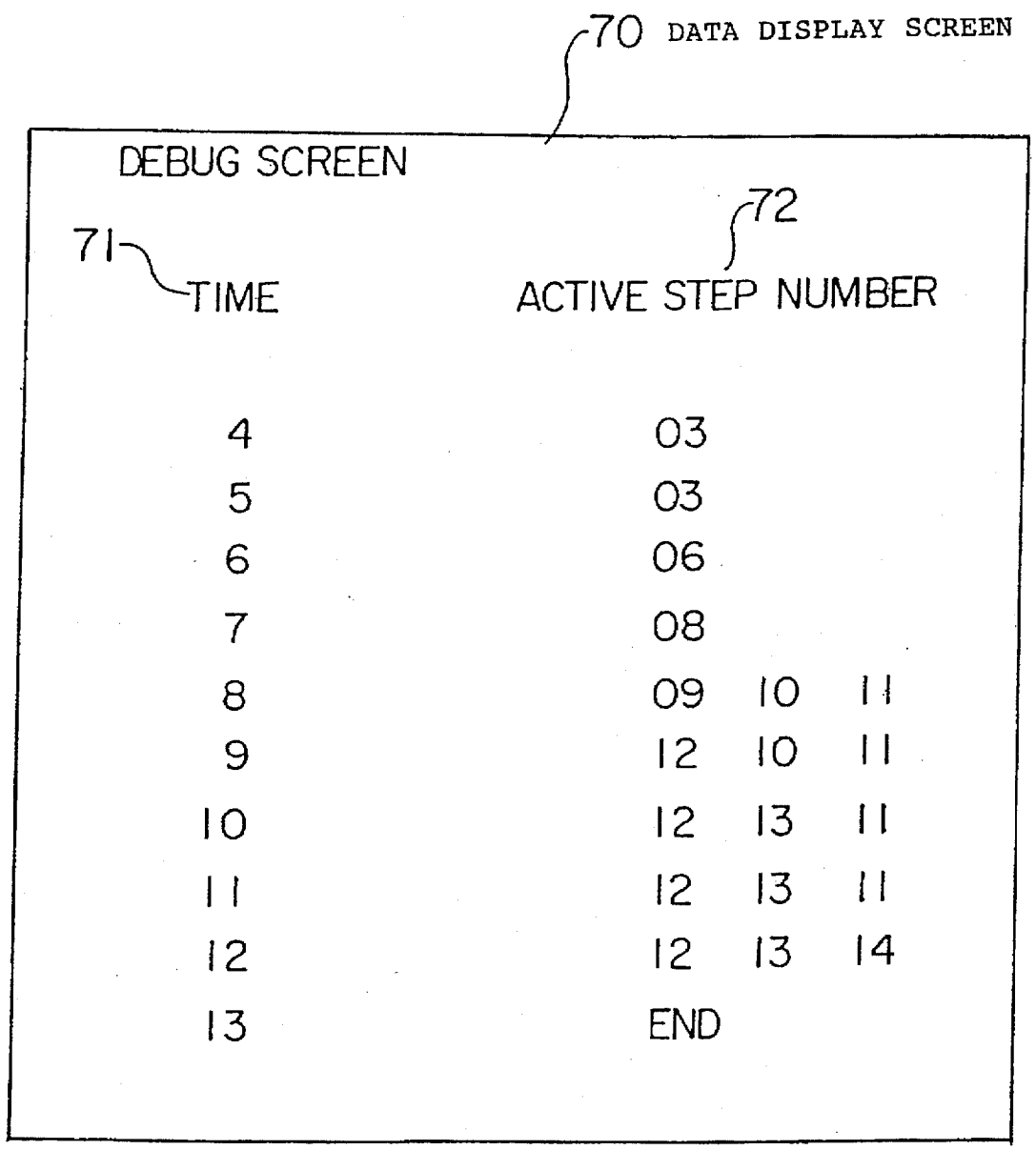
FIG. 1 is a diagram showing an example of displayed debugged data.

FIG. 1 shows an example of displayed debugged data. A data display screen 70 primarily includes a time display area 71 and an active step number display area 72. The time display area 71 displays a succession of times at which the steps are sampled at time intervals of 8 ms which are the same as the time intervals at which the data are sampled and stored. The active step number display area 72 displays the numbers of steps executed at the respective sampling times. The data displayed on the data display screen 70 may be scrolled by operating the keyboard 32.

The data displayed on the data display screen 70 indicates that the steps ST09, ST10, ST11 of the parallel branch section 52, for example, require respective execution times corresponding to 1, 2, and 4 sampling periods, i.e., about 8 ms, 16 ms, and 32 ms, respectively. Therefore, it can be seen at a glance that the execution speed of the entire parallel branch section 52 is determined by the step ST11.

By thus sampling steps which are executed at certain time intervals and displaying the sampled steps successively in a time series, the operator can easily confirm data such as execution speeds of certain steps as well as the overall flow of the program. Therefore, it becomes easy for the operator to know the system design efficiency and detect program faults, for example.

In this embodiment, the sampling time intervals are preset using the keyboard 32 or the like. However, insofar as data such as the approximate execution time of the entire program and the maximum number of steps that can be executed simultaneously in the parallel branch section are entered in advance, the sampling time intervals may be determined by the PMC 20 based on the entered data. Alternatively, the sequence program may be executed once, the execution time of the sequence program and the maximum number of simultaneously executable steps may be measured by the PMC 20, and the sampling time intervals may be determinedly the PMC 20 based on the measured data.

With the present invention, as described above, steps which are being executed are sampled at certain time intervals and the sampled steps are displayed successively in a time series. Therefore, the operator can confirm at a glance a chronological flow of executed steps, and hence can simply confirm the execution speeds of certain steps and the simultaneous execution of a plurality of parallel steps.

Therefore, it becomes easy for the operator to know the system design efficiency and detect program faults, for example.

We claim:

1. A system for debugging a sequence program having steps and generated by a sequential flowchart including a sequential function chart (SFC), comprising:
    program executing means for executing the sequence program;
    sampling means for sampling only the steps being executed, at predetermined time intervals, while said sequence program is being executed;
    step storage means for storing the sampled steps; and
    display means for displaying, for the predetermined time intervals, only the stored step numbers being executed at the corresponding predetermined time intervals.

2. A system according to claim 1, wherein said sampling means receives a preset numerical value from a user indicative of predetermined intervals.

3. A system according to claim 1, further comprising means for determining said predetermined time intervals based upon data of the sequence program received from a user.

4. A system according to claim 1, further comprising means for determining said predetermined time intervals based upon data of the sequence program received as a result of the sequence program having been executed once.

5. A system according to claim 1, further comprising means for determining said predetermined time intervals based upon an approximate execution time of the sequence program and maximum number of the steps that may be executed simultaneously entered by a user.

6. A system according to claim 1, further comprising:
    means for determining the execution time of the sequence program and a maximum number of the steps that may be executed simultaneously; and
    means for determining said predetermined time intervals based upon the execution time of the sequence program and the maximum number of the steps that may be executed simultaneously entered.

* * * * *